(12) United States Patent
Diab

(10) Patent No.: US 8,391,321 B2
(45) Date of Patent: Mar. 5, 2013

(54) METHOD AND SYSTEM FOR PATCH PANEL PORT IDENTIFICATION AND VERIFICATION

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 379 days.

(21) Appl. No.: 12/813,296

(22) Filed: Jun. 10, 2010

(65) Prior Publication Data

US 2011/0304313 A1 Dec. 15, 2011

(51) Int. Cl.
| | |
|---|---|
| *H04J 3/12* | (2006.01) |
| *G01R 31/08* | (2006.01) |
| *G01R 31/02* | (2006.01) |
| *G06F 11/00* | (2006.01) |
| *H01R 3/00* | (2006.01) |

(52) U.S. Cl. .......... 370/522; 370/252; 324/537; 714/44; 439/489

(58) Field of Classification Search ................... None
See application file for complete search history.

(56) References Cited

U.S. PATENT DOCUMENTS

| | | | | |
|---|---|---|---|---|
| 2007/0147354 | A1* | 6/2007 | He | 370/352 |
| 2008/0220721 | A1* | 9/2008 | Downie et al. | 455/41.3 |
| 2008/0253556 | A1* | 10/2008 | Cobb et al. | 379/442 |
| 2010/0008482 | A1* | 1/2010 | Tucker | 379/93.05 |
| 2010/0157516 | A1* | 6/2010 | Doorhy et al. | 361/679.02 |
| 2011/0008996 | A1* | 1/2011 | Pinn et al. | 439/489 |
| 2011/0141943 | A1* | 6/2011 | Shifris et al. | 370/254 |

* cited by examiner

*Primary Examiner* — Clemence Han
(74) *Attorney, Agent, or Firm* — Brinks Hofer Gilson & Lione

(57) ABSTRACT

Aspects of a method and system for patch panel port identification and verification are provided. In this regard, a patch panel may transmit, over a cable that is coupled to the patch panel, a signal that identifies the port of the patch panel to which the cable is coupled. The signal may comprise a common-mode signal communicated over one or more twisted pairs of the cable. The signal may comprise one or more Ethernet frames communicated in accordance with Ethernet standards. A device coupled to the patch panel may receive the signal, recover the patch port identifier from the signal, and store the patch port identifier to memory. The patch panel identifier may comprise, for example, an alphanumeric sequence comprising numbers, letters, or a combination of numbers and letters. The device may compare the received patch port identifier to an expected value.

20 Claims, 10 Drawing Sheets

METHOD AND SYSTEM FOR PATCH PANEL PORT IDENTIFICATION AND VERIFICATION

CROSS-REFERENCE TO RELATED APPLICATIONS/INCORPORATION BY REFERENCE

Not applicable

FIELD OF THE INVENTION

Certain embodiments of the invention relate to networking. More specifically, certain embodiments of the invention relate to a method and system for patch panel port identification and verification.

BACKGROUND OF THE INVENTION

The number an amount of networked devices used in today's Enterprises continues to grow as electronic information and communications are relied on more and more. In this regard, it is now common for just about every individual in the enterprise to have his or computer not to mention the plethora of mobile devices, printers, file servers, routers, network switches, and/or bridges, that also connect to the network. As a result, a look inside the server room of even a small company will often reveal a dizzying maze of cables, racks, and devices. These complex networks mean more time spent by information technology (IT) personnel maintaining and troubleshooting the network, which, in turn, means higher costs for the Enterprise as well as increased down time in the event of a network failure.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for patch panel port identification and verification, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for patch panel port identification and verification. In various embodiments of the invention, a patch panel may transmit, over a cable that is coupled to the patch panel, a signal that identifies the port of the patch panel to which the cable is coupled. The signal may comprise a common-mode signal communicated over one or more twisted pairs of the cable. The common-mode signal may be injected onto the one or more pairs of the cable via a center tap of one or more transformers. The common-mode signal may be inductively coupled onto the one or more twisted pairs. The signal may comprise one or more Ethernet frames communicated in accordance with Ethernet standards. A device coupled to the patch panel may receive the signal, recover the patch port identifier from the signal, and store the patch port identifier to memory. The patch panel identifier may comprise, for example, an alphanumeric sequence comprising numbers, letters, or a combination of numbers and letters. The device may compare the received patch port identifier to an expected value. The patch panel may be operable to detect insertion of the cable into the port, and perform the transmitting, in response to detecting the insertion of the cable into the port. The transmitting may be performed in response to a command received from a user interface of the patch panel. The transmitting may be performed in response to a command received service port of the patch panel.

Figure 1:
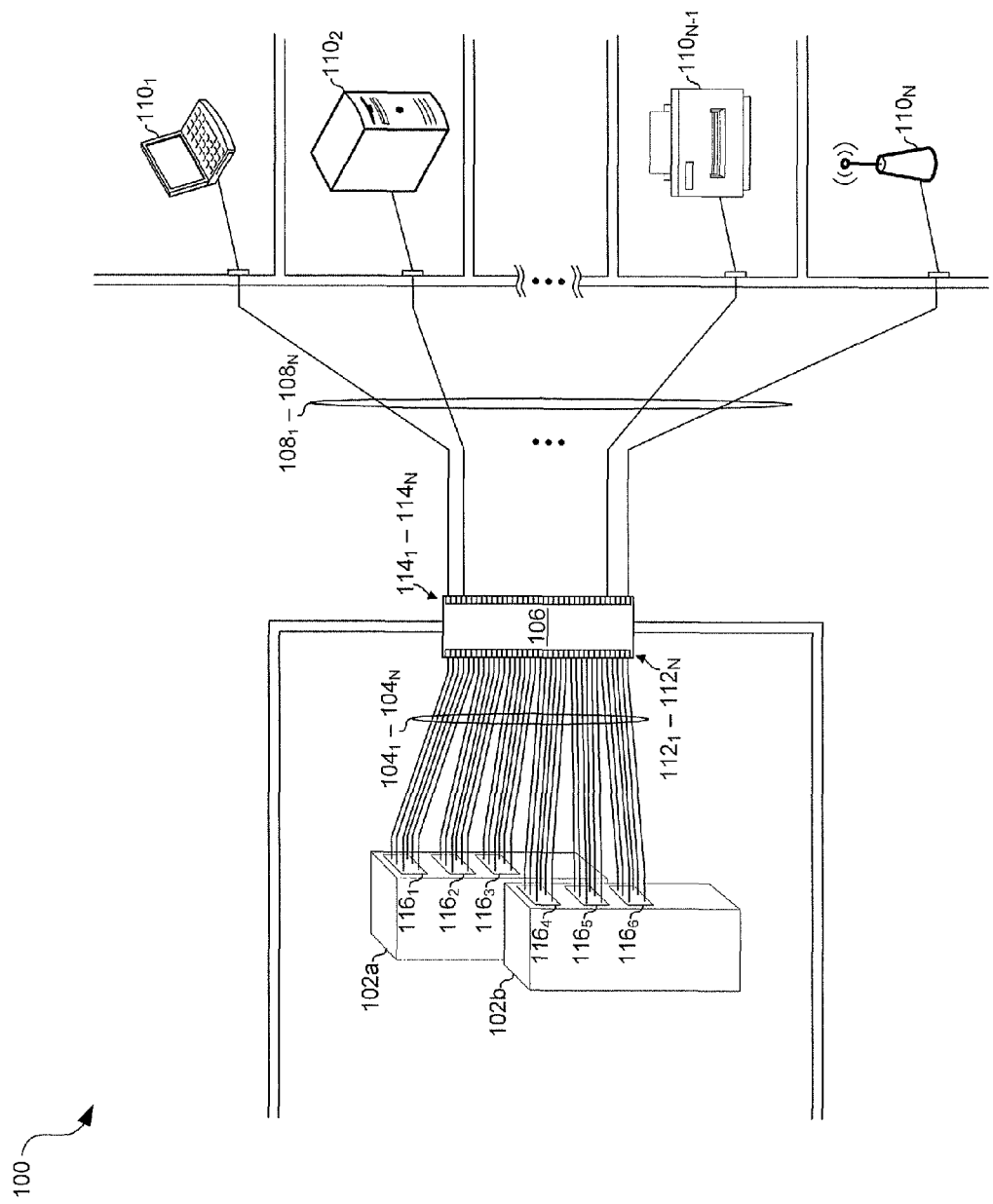
FIG. 1 is a diagram illustrating an exemplary Enterprise network, in accordance with an embodiment of the invention.

FIG. 1 is a diagram illustrating an exemplary network, in accordance with an embodiment of the invention. Referring to FIG. 1 there is shown a network 100 comprising racks 102*a* and 102*b*, each rack housing one or more network devices 116. The network devices 116 are coupled to a patch panel 106 via cables $104_1$-$104_N$, and network devices $110_1$-$110_N$ are coupled to patch panel 106 via cables $108_1$-$108_N$, where N is an integer greater than 0. The cables $104_1$-$104_N$ and may comprise, for example, structured, unstructured, shielded, and/or unshielded cabling. For example, the cabling may comprise twisted pair cabling of any category suitable for the application.

Each of the network devices 116 may comprise, for example, a switch, router, server, end-point, and/or any other networking device. Each of the network devices 116 may be operable to receive patch port identification signals. For example, each of the network devices 116 may be operable to detect and decode a common mode signals on one or more of the cables $104_1$-$104_N$.

Each of the network devices $110_1$-$110_N$ may comprise an end system such as a computer or a printer, and/or may comprise a core and/or edge network device such as a bridge, router, and/or network switch. Each of the network devices $110_1$-$110_N$ may be operable to receive patch port identification signals. For example, each of the network devices $110_1$-$110_N$ may be operable to detect and decode common mode signals on one or more of the cables $108_1$-$108_N$.

The patch panel 106 may comprise at least N ports, ports $112_1$-$112_N$, referred to herein as front-side ports, for connecting to the racks 102a and 102b and at least N ports, ports $114_1$-$114_N$, referred to herein as back-side ports, for connecting to the network devices $110_1$-$110_N$. The patch panel 106 may electrically couple each front-side port $112_n$ to a corresponding back-side port $114_n$ such that an end-to-end coupling between each network device $110_n$ and one of the network devices 116 is established, wherein n is an integer between 1 and N.

In various embodiments of the invention, the patch panel 106 may comprise suitable logic, circuitry, interfaces, and/or code that may be operable to transmit a port identification signal over one or more of the cables $104_1$-$104_N$ and/or over one or more of the cables $108_1$-$108_N$. That is, the patch panel 106 may be operable to transmit a signal on cable $104_n$ that identifies the front-side port $112_n$ that the cable $104_n$ is plugged into and/or to transmit a signal on cable $108_n$ that identifies the back-side port $114_n$ that the cable $108_n$ is plugged into. In various embodiment of the invention, the port 112n and/or 114n may be identified and/or managed utilizing one or more protocols such as and/or similar to simple network management protocol (SNMP).

In various embodiments of the invention, each port 112 and 114 of the patch panel 106 may be operable to detect insertion of a cable. For example, each port may comprise a mechanical switching element that is closed upon insertion of a cable.

In various embodiments of the invention, the patch panel 106 may comprise a user interface such as one or more buttons and/or controls and an LCD. In various embodiment of the invention, the patch panel 106 may comprise a service port, e.g., a serial port or USB port, via which a network admin may interface with the patch panel 106.

In various embodiments of the invention, patch port identifiers may be stored to a data structure which may be distributed among a plurality of devices and/or in a central device. In this regard, patch port identification and/or configuration information may be communicated among various devices in the network 100, including between patch ports, and/or may be communicated to devices external to the network 100. In addition to determined patch port configuration information, expected patch port configuration information may be communicated among various devices to enable verifying the appropriate connections have been made to one or more patch panels.

Figure 2:
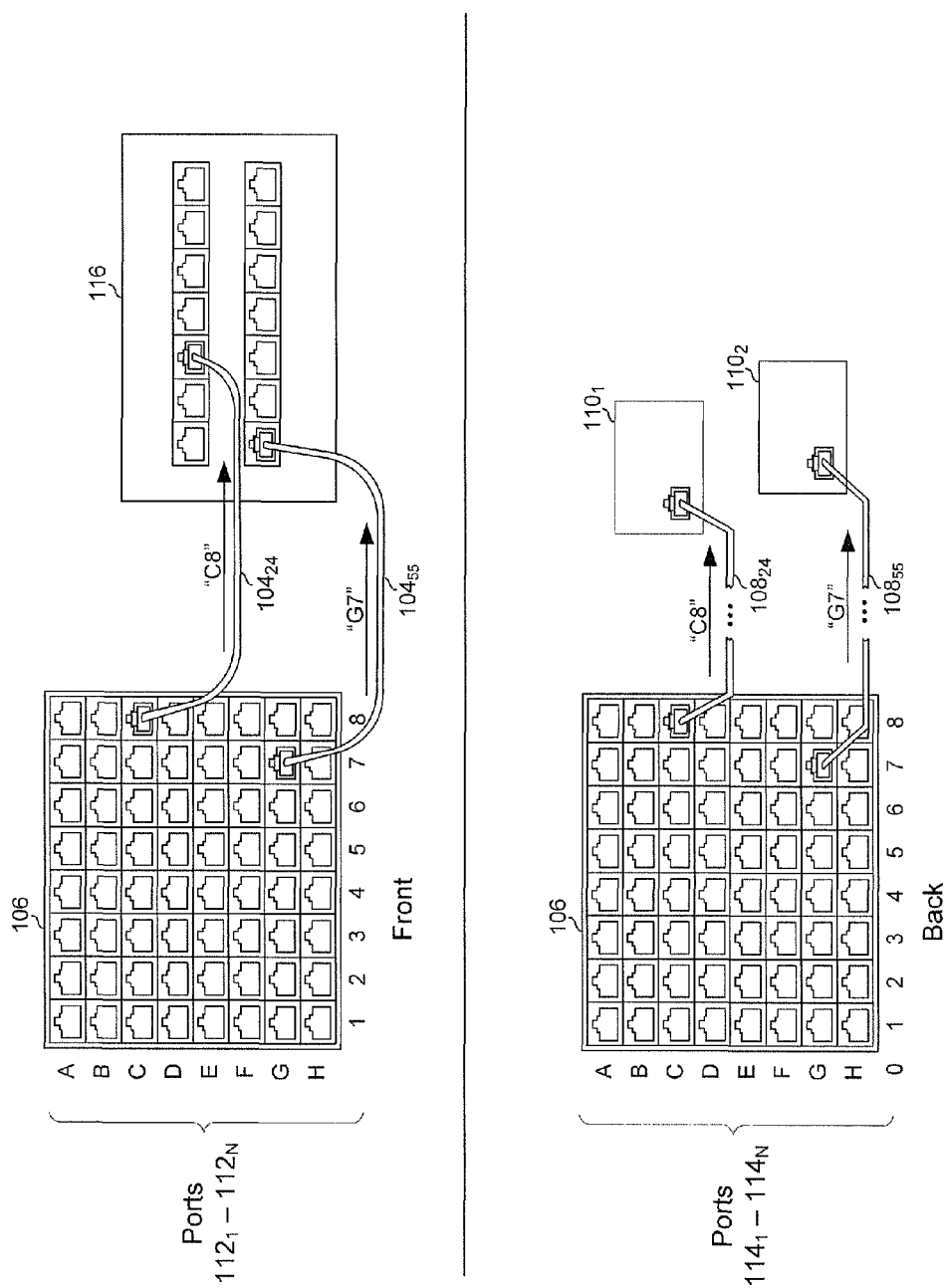
FIG. 2 is a diagram illustrating a patch panel operable to communicate patch panel port identifiers to connected devices, in accordance with an embodiment of the invention.

FIG. 2 is a diagram illustrating a patch panel operable to communicate patch panel port identifiers to connected devices, in accordance with an embodiment of the invention. Referring to FIG. 2 there is shown front and rear views of the patch panel 106, a network device 116, and network devices $110_1$ and $110_2$.

In the exemplary embodiment of the invention depicted in FIG. 2, the patch panel may comprise sixty-four front-side ports 112 with corresponding identifiers A1, A2, ... B1, ... H8, and sixty-four back-side ports 114 with corresponding identifiers A1, A2, ... B1, H8. In the exemplary embodiment of the invention depicted in FIG. 2, the network device 116 is coupled to the network device $110_1$ via patch panel ports $112_{24}$ and $114_{24}$, each of which may be associated with the identifier C8. Similarly, the network device 116 is coupled to the network device $110_2$ via patch panel ports $112_{55}$ and $114_{55}$, each of which may be associated with the identifier G7.

In operation, the patch panel 106 may be operable to transmit a patch port identification signal that communicates patch port identifier "C8" to the network device 116 via the cable $104_{24}$ and/or to the network device $110_1$ via the cable $108_{24}$. Similarly, the patch panel 106 may be operable to transmit a patch port identification signal that communicates the patch port identifier "G7" to the network device 116 via the cable $104_{55}$ and/or to the network device $110_2$ via the cable $108_{55}$.

Any suitable signaling techniques may be utilized for transmitting the port identification signal. In an exemplary embodiment of the invention, a common mode voltage may be injected and/or inductively coupled onto one or more twisted pairs of one or more of the cables $104_{24}$, $104_{55}$, $108_{24}$, and/or 10855. The common mode voltage may be pulsed, modulated, and/or otherwise controlled to communicate the corresponding port identifier. In an exemplary embodiment of the invention, the patch panel 106 may comprise an Ethernet transceiver and the transceiver may be operable to establish communications with the network device 116 via the cable $104_{24}$ and/or establish communications with the network device $110_1$ via the cable $108_{24}$ for communicating the patch port identifier. In an exemplary embodiment of the invention, an Ethernet transceiver may comprise a minimalist or stripped-down version of a conventional Ethernet transceiver. For example, the Ethernet transceiver may comprise only a single channel as opposed to four channels and/or may only support a single and/or low data rate.

Upon receiving the port identifiers, the network device 116 and/or each of the network devices $110_1$ and $110_2$ may store the port identifiers in a table, or other data structure, which may be utilized to verify, either manually or automatically, configuration of the network.

Figure 3A:
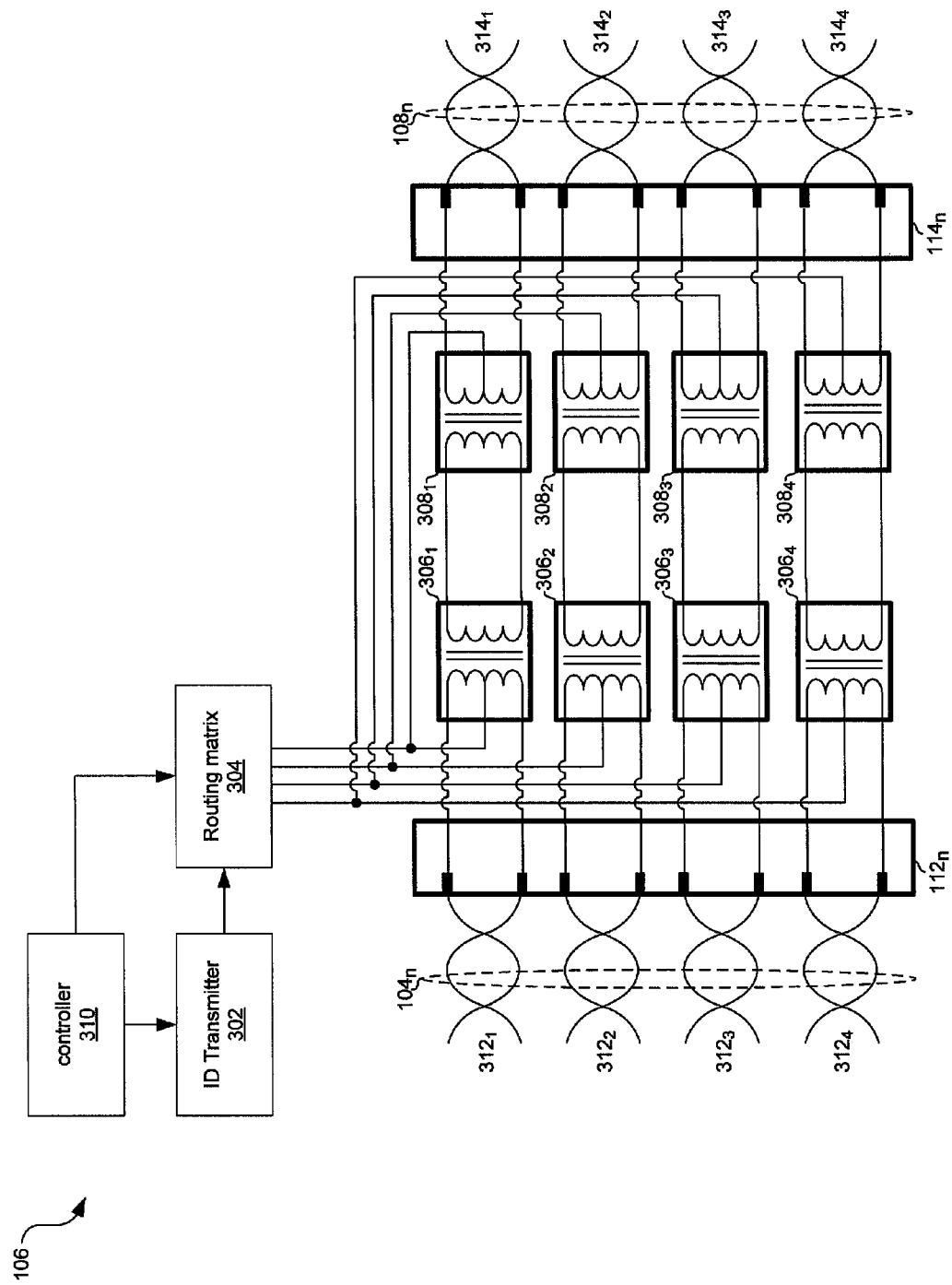
FIG. 3A is a diagram of an exemplary patch panel port via which a port identifier is communicated by injecting a common mode voltage onto one or more twisted pairs, in accordance with an embodiment of the invention.

FIG. 3A is a diagram of an exemplary patch panel port via which a port identification signal may be transmitted by injecting a common mode voltage onto one or more twisted pairs, in accordance with an embodiment of the invention. Referring to FIG. 3A there is shown a portion of patch panel 106 comprising a controller 310, a transmitter 302, routing matrix 304, front-side port $112_n$, back-side port $114_n$, and transformers $306_1$-$306_4$ and $308_1$-$308_4$ for coupling signals to the twisted pairs $312_1$-$312_4$ and $314_1$-$314_4$, respectively. The transformers 306 and 308 may each comprise a center tap via which a common mode voltage may be injected onto a corresponding twisted pair.

The controller 310 may comprise suitable logic, circuitry, interfaces, and/or code that may be operable to control operations of the patch panel 106. The controller 310 may be operable to, for example, configure the routing matrix 304 and/or the transmitter 302. In an exemplary embodiment of the invention, the controller 310 may comprise, for example, a general purpose processor, a programmable logic device, an application specific integrated circuit, and/or memory. In various embodiments of the invention, the controller 310 may comprise an interface for exchanging signals with a user interface of the patch panel 106 and/or with a service port, for example a USB port, of the patch panel 106.

The transmitter 302 may comprise suitable logic, circuitry, interfaces, and/or code that may be operable to generate a patch port identification signal. For example, the transmitter 302 may be operable to generate a series of pulses that communicate a patch port identifier. Any suitable encoding scheme may be utilized by the transmitter 302.

The routing matrix 304 may comprise one or more switching elements and conductive traces for coupling signals output from the transmitter 302 to a selected one or more patch ports 112 and/or 114.

In operation, the controller may determine to transmit a port identification signal via the port $112_n$ and/or $114_n$. In an exemplary embodiment of the invention, such a determination may be a result of detecting a cable insertion. In an exemplary embodiment of the invention, such a determination may be a result of, for example, a network administrator pushing a button or interfacing with the patch panel via a service port of the patch panel 106.

To transmit the patch port identifier corresponding to the ports $112_n$ and $114_n$, the controller 310 may first configure the routing matrix 304 such that the output of the transmitter 312 is coupled to the center tap of one or more of the transformers $306_1$-$306_4$ and/or $308_1$-$308_4$. The controller 310 may then convey a port identifier corresponding to the ports $112_n$ and $114_n$ to the transmitter 302, and enable the transmitter 302 to transmit a signal that communicates the port identifier. The port identification signal may be output by the transmitter 302, routed to the transformers 306 and 308 via the routing matrix 304, and appear as a common-mode signal on one or more of the twisted pairs $312_1$-$312_4$ and $314_1$-$314_4$.

In an exemplary embodiment of the invention, the patch panel 106 may be operable to function as a power over Ethernet mid-span and may be operable to provide supply power over on one or more of the twisted pairs $312_1$-$312_4$ and/or $314_1$-$314_4$ by injecting the power via a center tap of one or more of the transformers $306_1$-$306_4$ and/or $308_1$-$308_4$.

Although FIG. 3A depicts eight transformers, one for each of the twisted pairs of each cable $312_1$-$312_4$ and $314_1$-$314_4$, the invention is not so limited. For example, the patch panel may comprise only transformers $306_1$ and $308_1$, and patch port identification signals may be transmitted only on twisted pairs $312_1$ and $314_1$. Such an embodiment may result in a different impedance and/or phase shift for the twisted pairs $312_1$ and $314_1$ as compared to impedance and/or phase shift for the twisted pairs $312_2$-$312_4$ and the twisted pairs $314_1$-$314_4$. Such mismatch may be compensated for utilizing various techniques such as adjusting a length and/or width of traces in the patch panel 106 and/or loading traces with passive components.

Figure 3B:
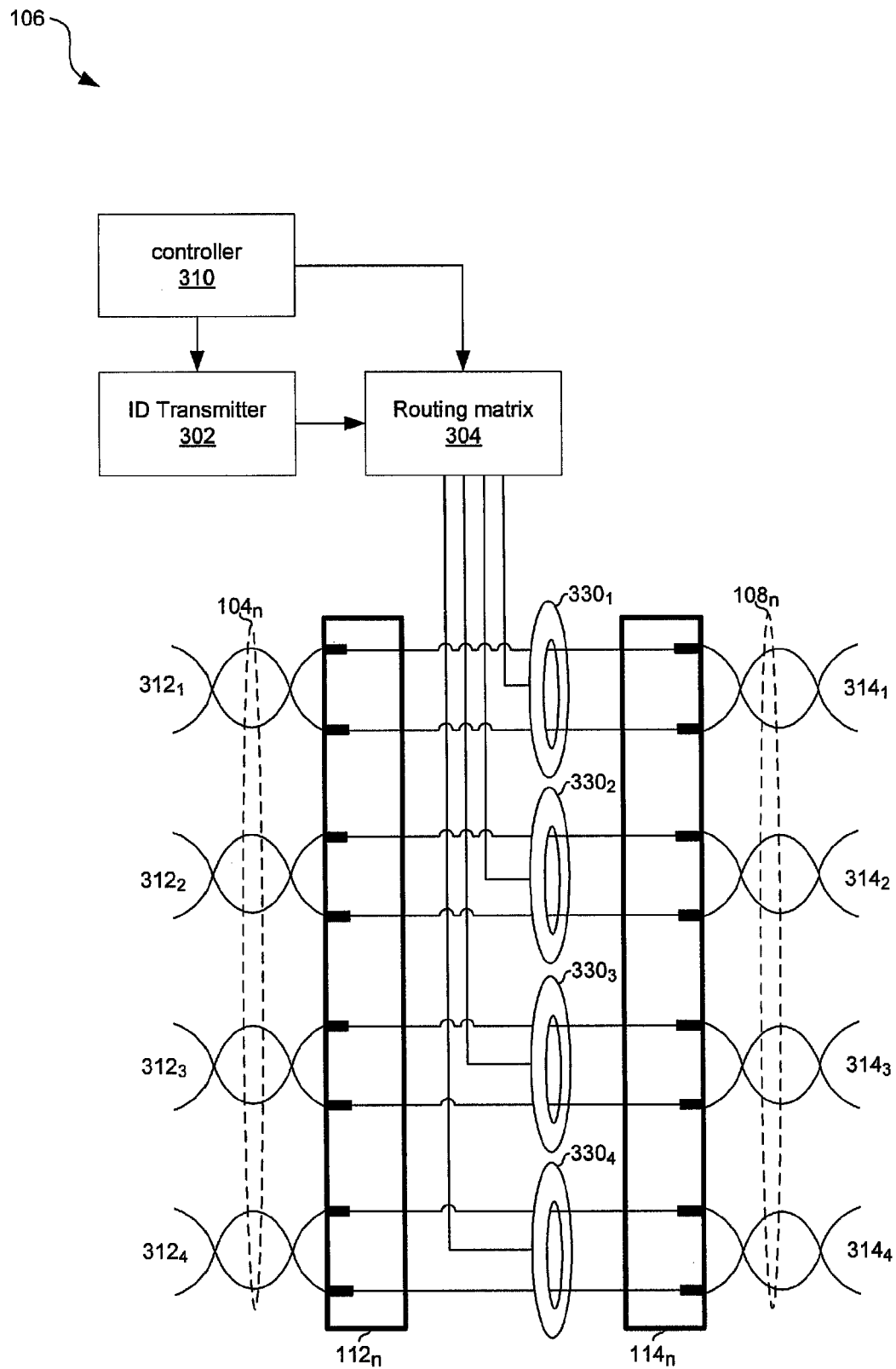
FIG. 3B is a diagram of an exemplary patch panel port via which a port identifier is communicated by inducing a common mode voltage onto one or more twisted pairs, in accordance with an embodiment of the invention.

FIG. 3B is a diagram of an exemplary patch panel port via which a port identifier is signaled by inducing a common mode voltage onto one or more twisted pairs, in accordance with an embodiment of the invention. Referring to FIG. 3B, there is again shown the controller 310, transmitter 302, routing matrix 304, the front-side port $112_n$, and the back-side port $114_n$. Also shown in FIG. 3B are inductive loops $330_1$-$330_4$. In the exemplary embodiment of the invention depicted in FIG. 3B, there are four loops 330 corresponding to the four twisted pairs of each of the cables 104n and 108n. However, the invention is not so limited and there may be anywhere from one to four loops 330 and each loop 330 may be associated with one or more twisted pairs.

Operation in FIG. 3B may be similar to operation described with respect to FIG. 3B with the exception that patch port identification signals may be inductively coupled onto one or more of the twisted pairs $312_1$-$312_4$ and/or $314_1$-$314_4$ via one or more of the loops $330_1$-$330_4$, rather than being injected onto one or more of the twisted pairs $312_1$-$312_4$ and/or $314_1$-$314_4$ via the transformers $306_1$-$306_4$ and $308_1$-$308_4$.

Figure 3C:
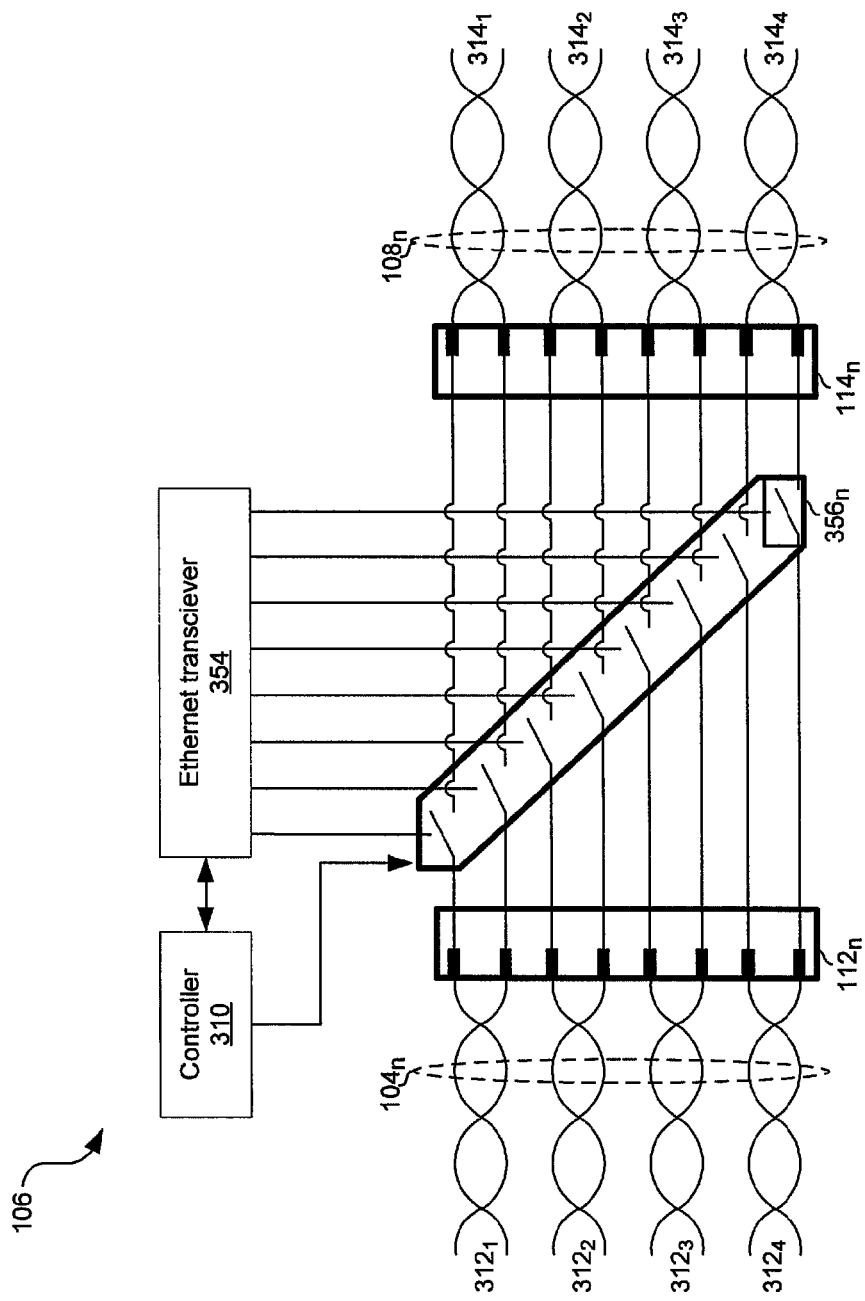
FIG. 3C is a diagram of an exemplary patch panel comprising an Ethernet transceiver which may be coupled to one or more ports of the patch panel, in accordance with an embodiment of the invention.

FIG. 3C is a diagram of an exemplary patch panel comprising an Ethernet transceiver which may be coupled to one or more ports of the patch panel, in accordance with an embodiment of the invention. Referring to FIG. 3C, there is shown a portion of the patch panel 106 comprising the controller 310, an Ethernet transceiver 354, front-side port $112_n$, back-side port $114_n$, and switching element $354_n$.

The Ethernet transceiver 354 may comprise suitable logic, circuitry, interfaces, and/or code that may be operable to communicate in accordance with Ethernet protocols. The Ethernet transceiver 354 may be operable to connect, for example using autonegotiation, to a link partner, and may be operable to exchange Ethernet packets with the link partner.

The switching element $356_n$ may be configurable to connect the front-side port $112_n$ to either the transceiver 354 or to the back-side port $114_n$. In this regard, the switching element 356n may be one of N switching elements $356_1$-$356_N$ which may enable selecting which patch panel port is coupled to the transceiver 354.

The controller 310 may be as described with respect to FIGS. 3A and 3B. The controller 310 may be operable to exchange data with and/or provide control signals to the Ethernet transceiver 354. Also, the controller 310 may be operable to generate one or more control signals for configuring switching elements $356_1$-$356_N$ for selecting which one of the front-side ports $112_1$-$112_N$ and/or back-side ports $114_1$-$114_N$ is coupled to the transceiver 354.

In operation, the controller may determine to transmit a port identification signal via the port $112_n$ and/or $114_n$. In an exemplary embodiment of the invention, such a determination may be a result of detecting a cable insertion. In an exemplary embodiment of the invention, such a determination may be a result of, for example, a network administrator pushing a button or interfacing with the patch panel 106 via a service port of the patch panel 106.

To transmit the patch port identifier corresponding to the ports $112_n$ and $114_n$, the controller 310 may first configure the switching elements $356_1$-$356_N$ such that the transceiver is coupled to a single front-side port $112_n$. The controller 310 may then enable the transceiver 354 to begin communicating. The transceiver 354 may enter an autonegotiation mode and attempt to establish an Ethernet connection to the link partner 116. Once the connection is established, an Ethernet frame comprising the patch port identifier corresponding to port $112_n$ may be communicated to the link partner 116.

Figure 3D:
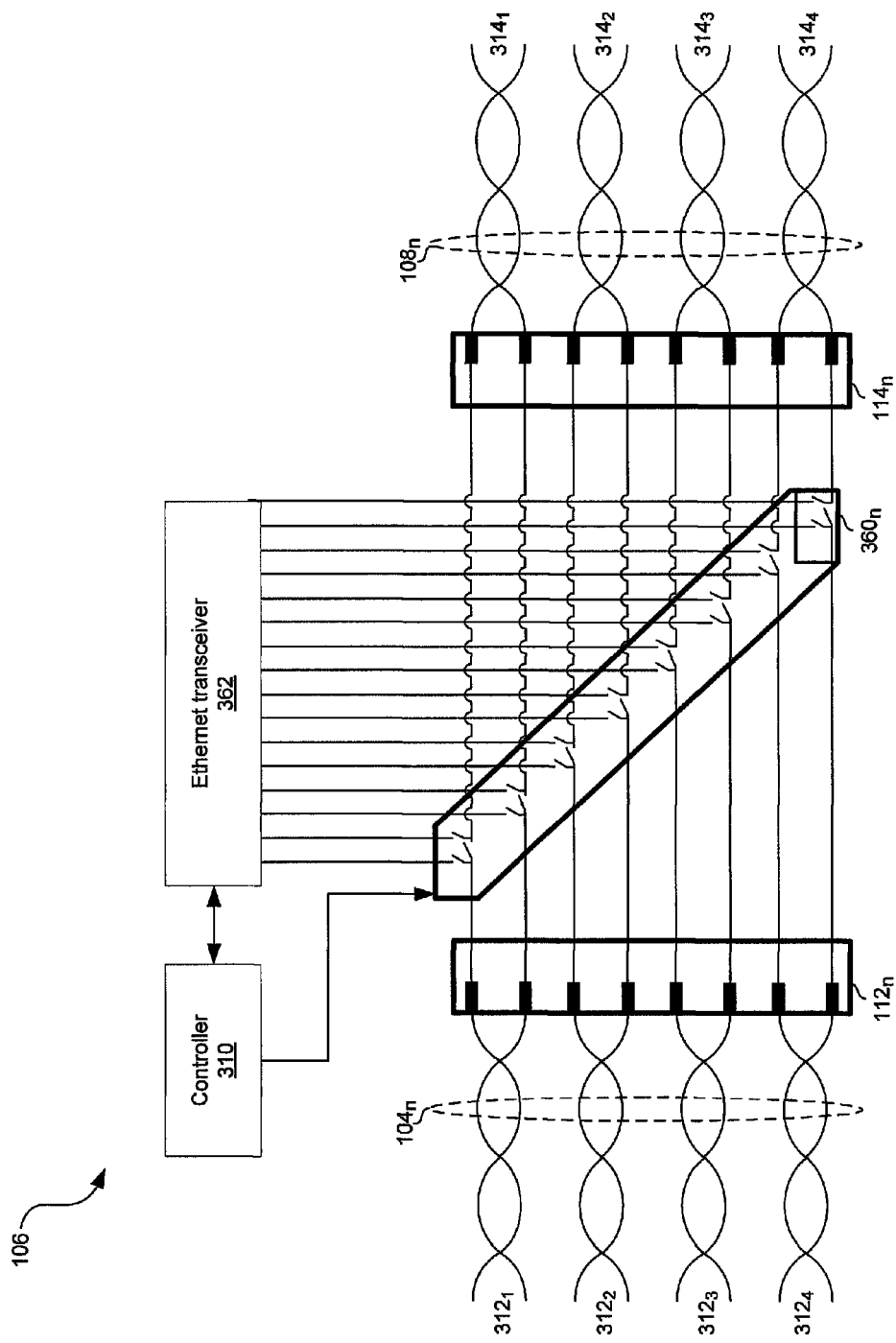
FIG. 3D is a diagram of an exemplary patch panel comprising an Ethernet transceiver which may modify and/or insert traffic, in accordance with an embodiment of the invention.

FIG. 3D is a diagram of an exemplary patch panel comprising an Ethernet transceiver which may modify and/or insert traffic, in accordance with an embodiment of the invention. Referring to FIG. 3D there is shown the controller 310, as described with respect to FIGS. 3A-3C, an Ethernet transceiver 362, and a switching element $360_n$.

The switching element $360_n$ may be configurable to switch the transceiver 360 into and out of the path between the ports $112_n$ and the port $114_n$. In this regard, the switching element 356n may be one of N switching elements $356_1$-$356_N$ which may enable selecting which patch panel ports are coupled to the transceiver 360.

The Ethernet transceiver 362 may comprise suitable logic, circuitry, interfaces, and/or code that may be operable to communicate in accordance with Ethernet protocols. The Ethernet transceiver 362 may be operable to receive data via the port $112_n$, modify and/or otherwise process the traffic, and output the modified traffic via the port $114_n$. Similarly, the Ethernet transceiver 362 may be operable to receive data via the port $114_n$, modify and/or otherwise process the traffic, and output the modified traffic via the port $112_n$. The Ethernet transceiver 354 may be operable to, for example, modify portions of one or more Ethernet frames, drop Ethernet frames, and/or insert new Ethernet frames into a stream of traffic. An exemplary Ethernet transceiver 362 is depicted in FIG. 3E.

Figure 3E:
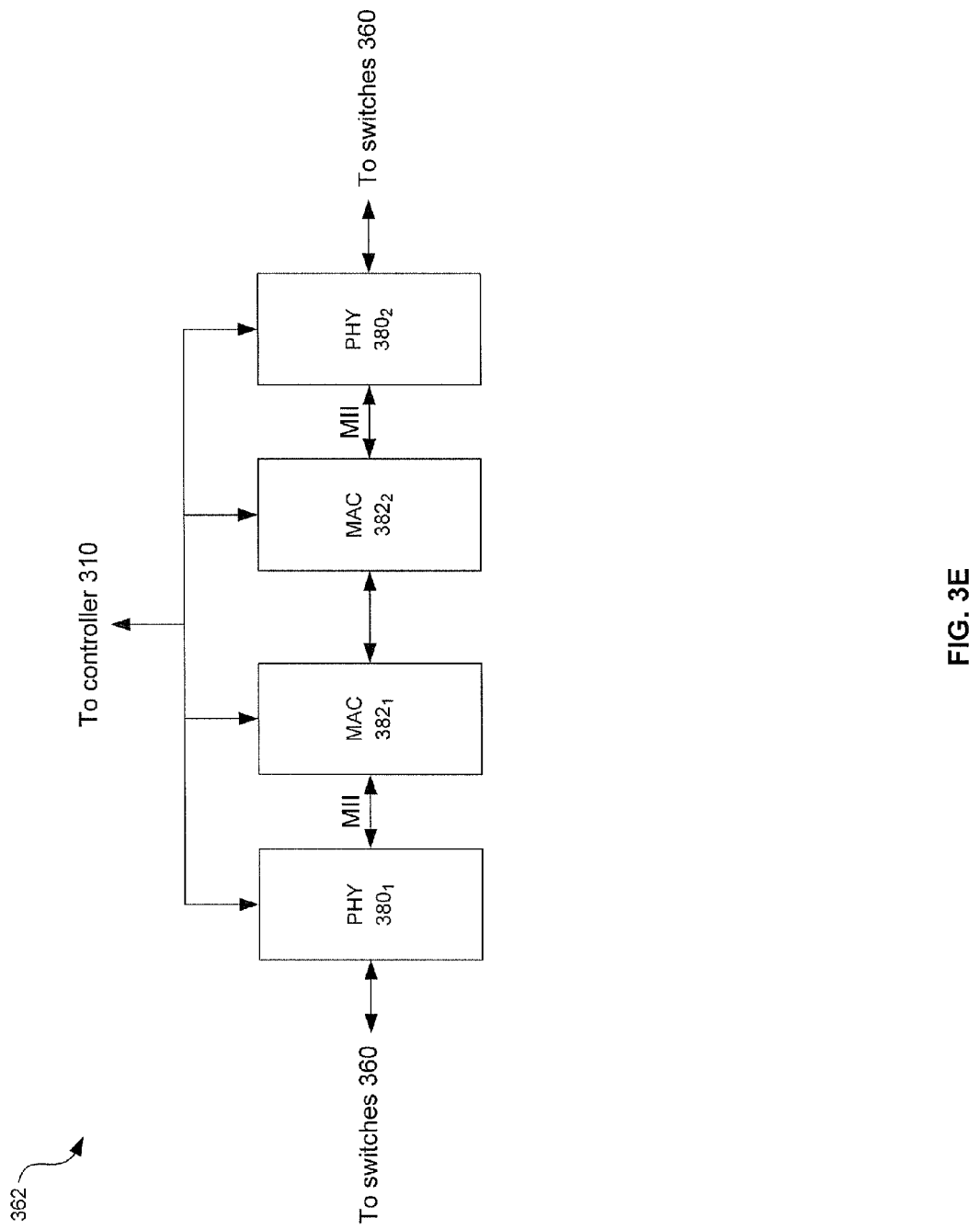
FIG. 3E is a block diagram of an exemplary Ethernet transceiver in a patch panel, in accordance with an embodiment of the invention.

FIG. 3E is a block diagram of an exemplary Ethernet transceiver in a patch panel, in accordance with an embodiment of the invention. Referring to FIG. 3E, the transceiver 362 may comprise PHYs $380_1$ and $380_2$ and MACs $382_1$ and $382_2$. The MACs may be coupled "back-to-back" to enable modifying frames, dropping frames, inserting frames, and/or otherwise processing frames as the are communication between the ports 112 and 114. The transceiver 360 may be relatively simple compared to conventional device which may be operable to processes Ethernet frames.

Figure 4:
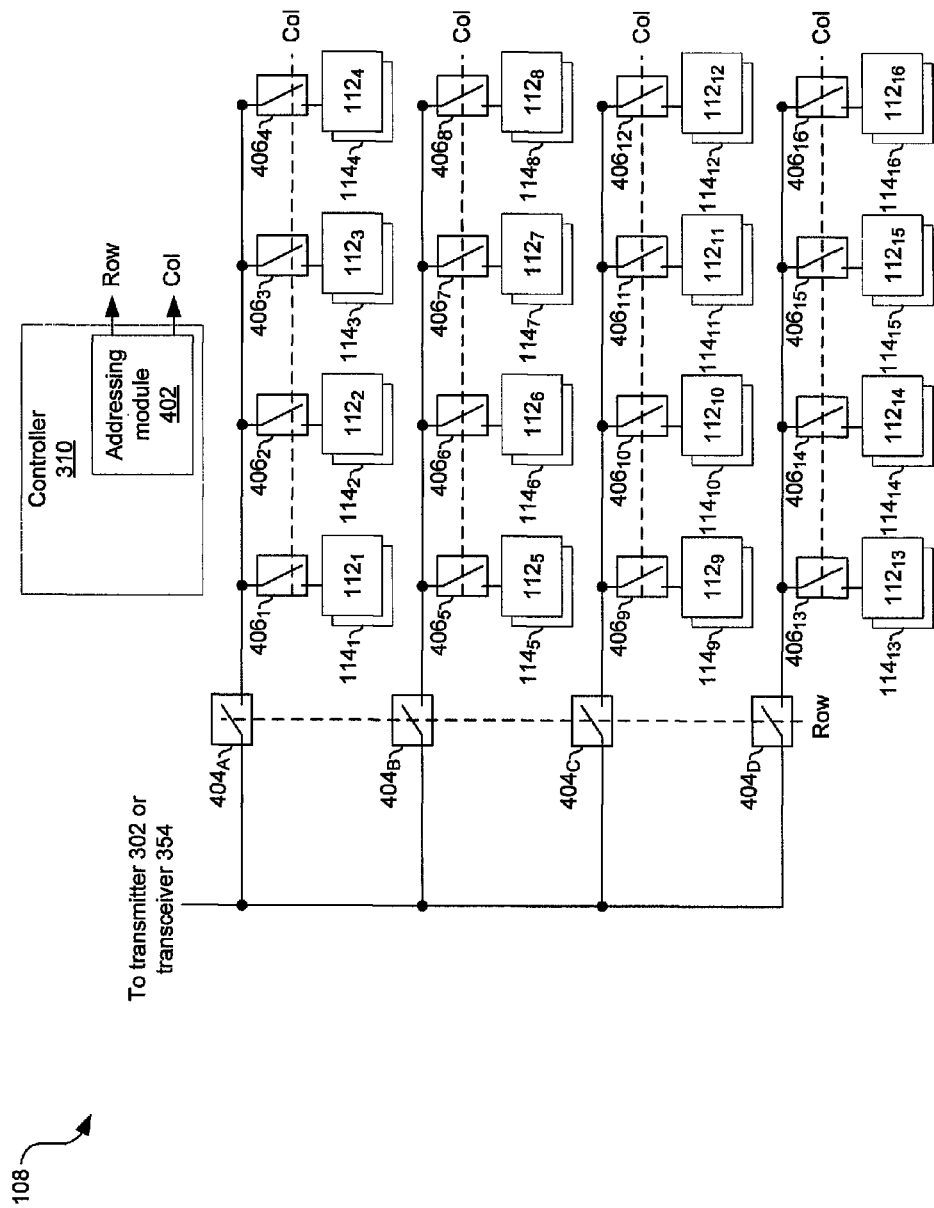
FIG. 4 is a diagram illustrating an exemplary addressing scheme for selecting a patch panel port via which a port identifier may be transmitted or Ethernet signals may be exchanged, in accordance with an embodiment of the invention.

FIG. 4 is a diagram illustrating an exemplary addressing scheme for selecting a patch panel port via which a port identifier may be transmitted or Ethernet signals may be exchanged, in accordance with an embodiment of the invention. Referring to FIG. 4 there is shown an exemplary patch panel 106 comprising sixteen front-side ports $112_1$-$112_{16}$ and sixteen corresponding back-side ports $114_1$-$114_{16}$.

The controller 310 may comprise an addressing module 402 which may be operable to generate control signals for controlling the switching elements $404_A$-$404_D$ and $406_1$-$406_{16}$ to select a port or ports for transmitting a port identification signal.

In operation, a pair of ports $112_n$ and $114_n$ may be selected in much the same manner that a memory address may be selected in a conventional memory device. For example, to select ports $112_9$ and $114_9$, the controller 310 may input "9" to the addressing module and the addressing module may set the Row signal to "C" and set the column signal to "1". With Row set to "C," switching element $404_C$ may be closed and switching elements $404_A$, $404_B$, and $404_D$ may be open. With Col set to "1," switching elements $406_1$, $406_5$, $406_9$, and $406_{13}$ may be closed and the remaining switching elements 406 may be open. With this configuration of the switching elements, ports $112_9$ and/or $114_9$ may be coupled to the transmitter 302 (FIGS. 3A and 3B) or the transceiver 354 (FIG. 3C) and the port identifier for patch ports $112_9$ and $114_9$ may be communicated to devices coupled to those ports.

Figure 5:
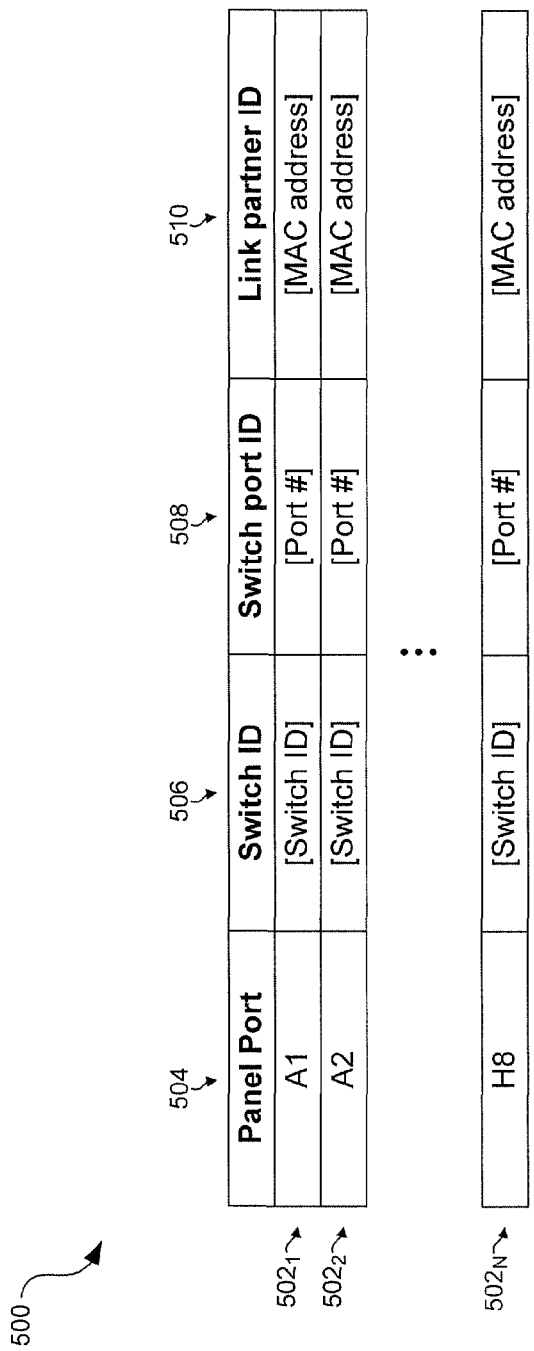
FIG. 5 is a diagram illustrating an exemplary data structure for indicating network configuration, in accordance with an embodiment of the invention.

FIG. 5 is a diagram illustrating an exemplary data structure for indicating network configuration, in accordance with an embodiment of the invention. Referring to FIG. 5, there is shown a table 500 which may be generated and/or stored in a network device 116 (FIGS. 1 and 2) and/or network device 110 (FIGS. 1 and 2). The table may comprise entries $502_1$-$502_N$ corresponding to the N pairs of patch panel ports 112 and 114. Each entry may comprise a Panel Port ID field 504, a network switch identifier field 506, a switch port identifier field 508, and link partner ID field 510. In instances that multiple network switches are coupled to the patch panel, the network switch ID field 506 may enable distinguishing ports of one network switch from ports of another when two of the ports have the same port ID. For example, to distinguish port #1 of network switch $116_1$ from port #1 of network switch $116_2$. The link partner ID field 510 may, for example, store the MAC address of the device port to which the patch panel port is coupled.

Figure 6:
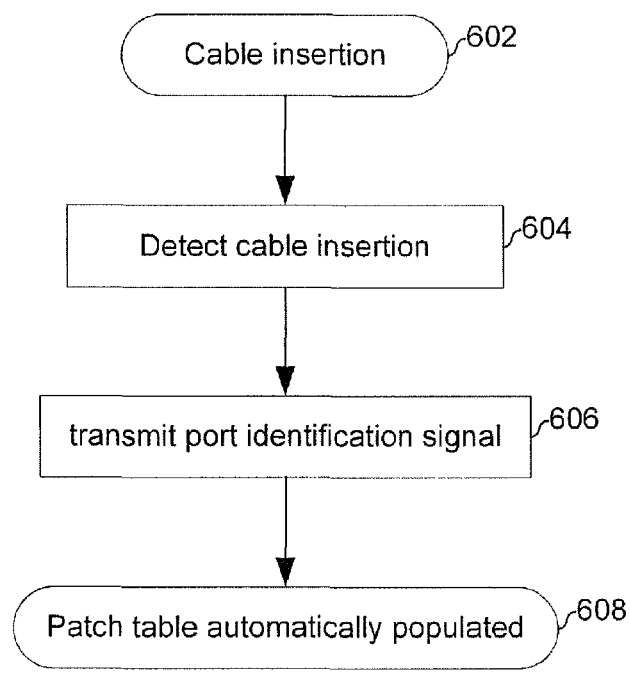
FIG. 6 is a flow chart illustrating exemplary steps for patch panel port identification, in accordance with an embodiment of the invention.

FIG. 6 is a flow chart illustrating exemplary steps for patch panel port identification, in accordance with an embodiment of the invention. Referring to FIG. 6, in step 602 a cable may be inserted into a port $112_n$ of a patch panel 106. In step 604 the insertion of the cable may be detected via, for example, a mechanical switching element in the port $112_n$. For example, insertion of the cable may close the switching element which may, in turn, ground an input to the controller 310. Upon seeing ground on the signal, the controller 310 may determine that a cable has been inserted into port $112_n$. In step 606, the controller 310 may generate one or more control signals to configure one or more switching elements such that the port $112_n$ is coupled to the transmitter 302 (FIGS. 3A and 3B) or to the transceiver 354 (FIG. 3C). The controller 310 may then trigger the transmitter 302 to transmit the port identifier, or trigger the transceiver 354 to establish an Ethernet connection and then transmit the port identifier in an Ethernet frame.

In step 608, the link partner coupled to the port $112_n$ may detect and decode the port identification signal. In various embodiments of the invention, a data structure, such as the table 500, may be populated based on the received port identification signal. The table 500 may then be utilized to verify configuration of the network 100 and/or utilized for maintenance and/or troubleshooting of the network 100. For example, a table populated based on the received port identification signals may be compared to expected values obtained from a master table generated by a network administrator. That is, the master table may correspond to the correct configuration of the network and deviation from the master table may indicate an incorrect connection has been made. Additionally or alternative, the table may be displayed on a monitor or printed for use by the network administrator.

Although various aspects of the invention are described with regard to communications over copper wiring, such aspects may be applicable to optical communications. For example, the cables 104 may comprise optical fibers, the transformers 306 and 308 and/or loops 330 may be replaced by optical and/or electro-optical components, and the transceiver 354 may comprise an optical transceiver.

Various aspects of a method and system for patch panel port identification and verification are provided. In an exemplary embodiment of the invention, a patch panel 106 may transmit, over a cable $104_n$ that is coupled to the patch panel 106, a signal that communicates an alphanumeric identifier of the port $112_n$ of the patch panel 106 to which the cable $104_n$ is coupled. The signal may comprise a common-mode signal communicated over one or more twisted pairs 312 of the cable 104. The common-mode signal may be injected onto the one or more pairs 312 of the cable 104 via a center tap of one or more transformers 306. The common-mode signal may be inductively coupled onto the one or more twisted pairs 312. The signal may comprise one or more Ethernet frames communicated in accordance with Ethernet standards. A device 116 coupled to the patch panel 106 may receive the signal, recover the patch port identifier from the signal, and store the patch port identifier to memory, such as in a table 500. The device 116 may compare the received patch port identifier to an expected value. The patch panel 106 may be operable to detect insertion of the cable $104_n$ into the port $112_n$, and perform the transmitting, in response to detecting the insertion of the cable $104_n$ into the port $112_n$. The transmitting may be performed in response to a command received from a user interface of the patch panel 106. The transmitting may be performed in response to a command received service port of the patch panel 106.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for patch panel port identification and verification.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   transmitting, by a circuit in patch panel, a signal over a cable coupled to a port of the patch panel, wherein the signal communicates an alphanumeric identifier of the port of the patch panel to which the cable is coupled.

2. The method according to claim 1, comprising transmitting, by the circuit in the patch panel, the signal as a common-mode signal on a twisted pair of the cable.

3. The method according to claim 2, further comprising injecting the common-mode signal onto the twisted pair via a center tap of a transformer.

4. The method according to claim 2, further comprising inductively coupling the common-mode signal onto the twisted pair.

5. The method according to claim 1, wherein the signal comprises an Ethernet frame.

6. The method according to claim 1, further comprising:
   receiving the signal at a device coupled to the patch panel via the cable; and
   storing in memory, the alphanumeric identifier of the port of the patch panel to which the cable is coupled.

7. The method according 6, further comprising:
   comparing, by the device, the alphanumeric identifier to an expected value.

8. The method according to claim 1, further comprising:
   detecting, by the circuit, insertion of the cable into the port; and
   where transmitting occurs in response to detecting the insertion of the cable into the port.

9. The method according to claim 1, comprising transmitting in response to a command received from a user interface of the patch panel.

10. The method according to claim 1, comprising transmitting in response to a command received through a service interface of the patch panel.

11. A system for networking, the system comprising:
    a circuit in a patch panel, wherein the circuit is operable to:
    transmit a signal over a cable coupled to a port of the patch panel, wherein the signal communicates an alphanumeric identifier of the port of the patch panel to which the cable is coupled.

12. The system according to claim 11, wherein the circuit is operable to transmit the signal as a common-mode signal on a twisted pair of the cable.

13. The system according to claim 12, wherein the circuit comprises a transformer and the circuit is further operable to inject the common-mode signal onto the twisted pair via a center tap of the transformer.

14. The system according to claim 12, wherein the circuit is further operable to inductively couple the common-mode signal onto the twisted pair.

15. The system according to claim 11, wherein the circuit comprises an Ethernet transceiver and the signal comprises an Ethernet frame.

16. The system according to claim 11, further comprising:
    a device coupled to the patch panel via the cable, the device operable to:
    receive the signal; and
    store in memory the alphanumeric identifier of the port of the patch panel to which the cable is coupled.

17. The system according 16, wherein the device is further operable to compare the alphanumeric identifier to an expected value.

18. The system according to claim 11, wherein the circuit is further operable to:
    detect insertion of the cable into the port; and
    transmit the signal in response to detection of the insertion of the cable into the port.

19. The system according to claim 11, wherein the circuit is operable to transmit the signal in response to a command received from a user interface of the patch panel.

20. The system according to claim 11, wherein the circuit is operable to transmit the signal in response to a command received through a service interface of the patch panel.

* * * * *